Patented Aug. 16, 1932

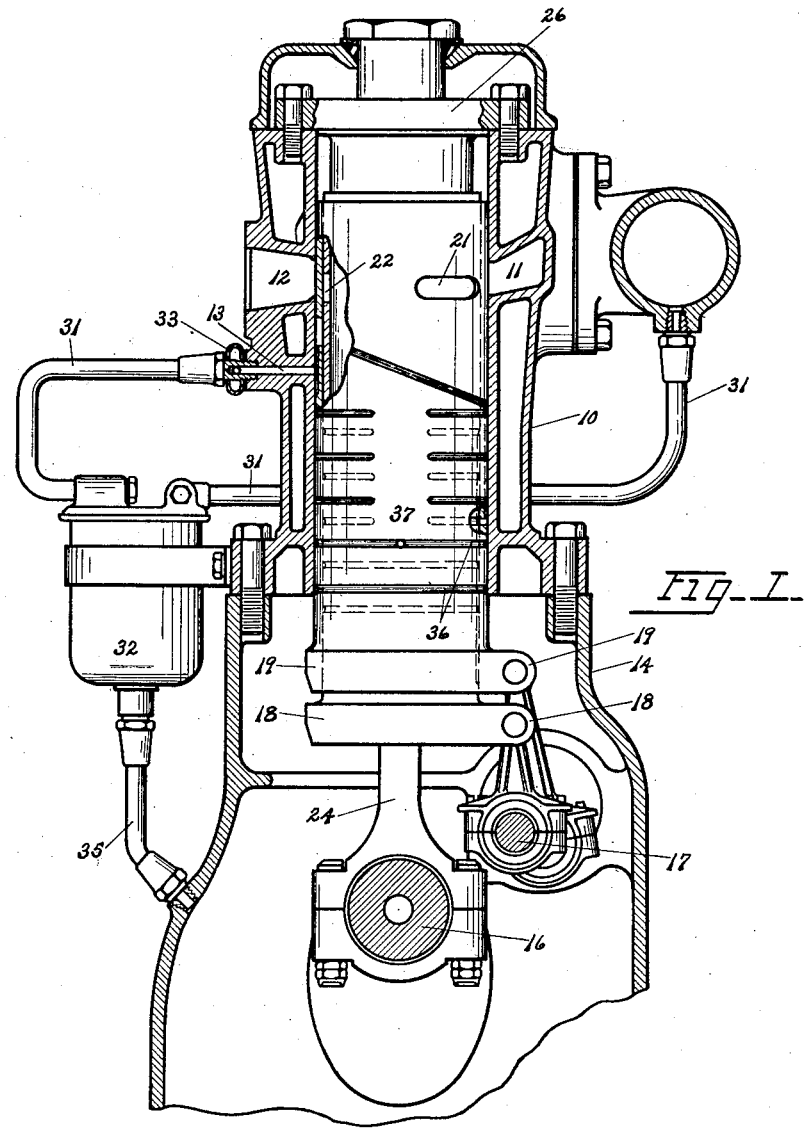

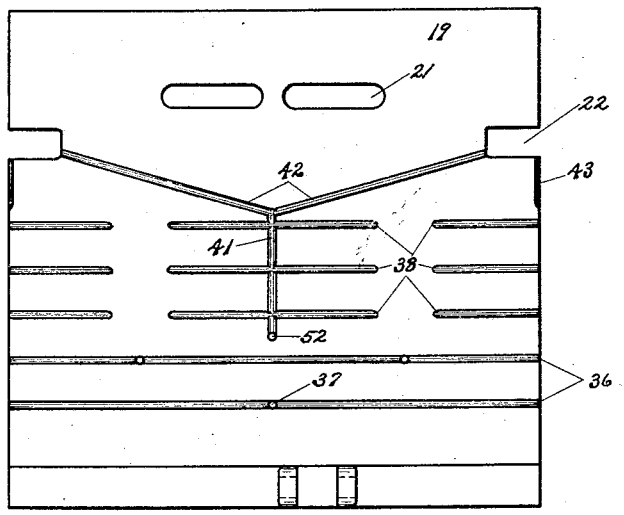
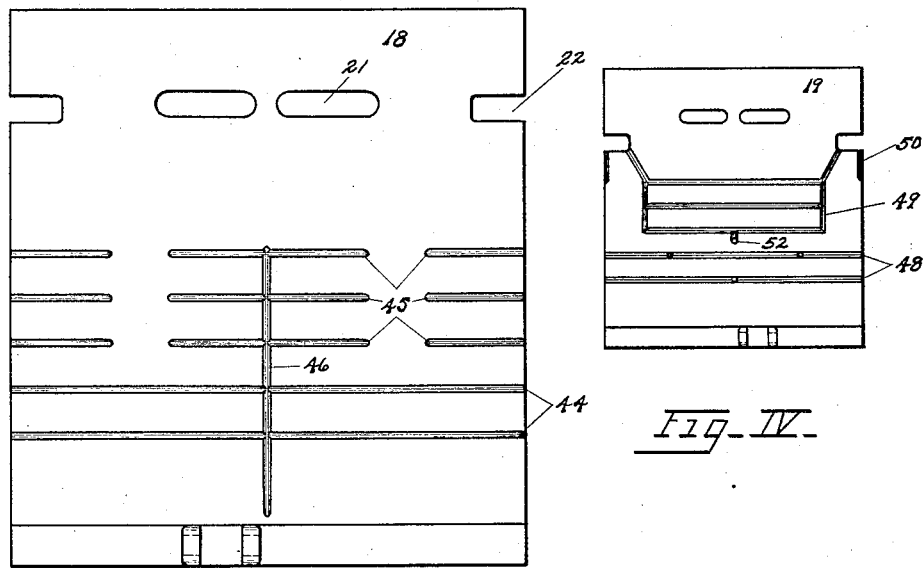

1,872,295

UNITED STATES PATENT OFFICE

WARREN T. HUNT, OF EAST ORANGE, NEW JERSEY, ASSIGNOR TO THE WILLYS-OVERLAND COMPANY, OF TOLEDO, OHIO, A CORPORATION OF OHIO

SLEEVE VALVE ENGINE LUBRICATION SYSTEM

Application filed November 2, 1928, Serial No. 316,705. Renewed January 21, 1932.

My invention relates to sleeve valve engines, for example, engines of the Knight class, and it has particular relation to the lubrication of the valve sleeves thereof.

One object of the invention is to provide a method of lubrication for the valve sleeves of an engine by which the surplus oil, which normally accumulates about the intake port area, is drawn to the exhaust port side of the sleeve, thereby not only avoiding the accumulation on the intake port side but promoting lubrication on the exhaust port side.

It is a further object of this invention to draw the surplus oil away from the intake port side of the engine where it would normally be drawn into the combustion chamber, to the exhaust port side which is normally under-lubricated and where there is no danger of drawing the lubricant into the combustion chamber.

It is an additional object of this invention to provide a lubrication system, as well as a method for promoting lubrication which will obviate the necessity of an external oil circulating mechanism or oil trap, and at the same time, providing for the oil whereby it will not be drawn into the combustion chamber.

Another object of the invention contemplates a method of circulating oil over the surface of the sleeves, whereby an optimum quantity of lubricant is supplied to all parts of the sleeves and no substantial surplus is allowed to accumulate about the intake port region.

These, together with other objects of my invention, will become apparent to those skilled in the art after a study of the structure and description herein, of an embodiment of the invention which may be preferred.

Figure I is an elevational view, partly in section, of a sleeve valve engine embodying one form of my invention.

Fig. II is a development of the outer sleeve illustrated in Figure 1.

Fig. III is a development of the inner sleeve illustrated in Figure I; and

Fig. IV is a development of the outer sleeve, embodying certain modifications in the arrangement of the grooves over that illustrated in Fig. II.

In practicing my invention one may employ a Knight engine, consisting of a jacketed cylinder block 10 having intake 11 and exhaust ports 12, as well as a tapped opening 13 below the exhaust port. The block is bolted to a crank case 14 wherein are journalled a crank shaft 16, and a cam shaft 17 which are operated in synchronized relation with respect to each other.

The cam shaft reciprocates an inner sleeve 18 and an outer sleeve 19 each having an intake port 21 and an exhaust port 22 and each being connected by individual connecting rods to the shaft 17. Within the inner sleeve a piston 23 (not shown) is reciprocated and connected to the crank shaft by a connecting rod 24 in the conventional manner. At the top of the block there is bolted a head 26, which projects downwardly within the inner sleeve in sealed slidable relation therewith.

The operation of the engine is well understood and requires no explanation, it being sufficient to state that the sleeves move thru a single cycle while the piston moves through two cycles and that one sleeve is advanced ahead of the other approximately 70 degrees. Once during each two complete turns of the crank shaft the intake ports of the sleeves and cylinder are aligned to permit the gasoline-air mixture to be drawn into the chamber; similarly once each two complete revolutions of the crankshaft the exhaust ports of the sleeves and cylinder are aligned to allow the combusted gases to be discharged from the chamber.

Lubrication of both the piston and sleeves is accomplished by means of the oil that is thrown on the portion of the sleeves projecting into the crank case. The oil works its way to the upper portion of the sleeves by capillary attraction and the relative movement therebetween. Ordinarily more oil accumulates on the intake port side than on the exhaust port side and is drawn into the chamber through the intake ports. The exhaust port side, on the other hand, frequently suffers a lack of oil and since this portion of the sleeve is generally hotter than any other portion insufficient lubrication becomes a critical problem.

According to the present invention, there is provided a source of suction, such for example, as that existing in the intake manifold, which is communicated to the sleeves through a tube member 31, by way of an oil trap 32. The oil trap is not a necessity to the present invention and may be omitted, in which case the tube is connected directly to a bus bar 33 which communicates through the tapped opening 13 with the outer sleeve surface.

The operation of the oil trap is well understood. It consists of a float mechanism which permits the oil to be collected in a chamber and discharged periodically back into the crank case through a discharge tube 35 at the base thereof.

The outer sleeve is of the conventional design differing only in its arrangement of grooves. At the lower extremity of the sleeve there are two parallel grooves 36 which pass completely around the sleeve and which include holes 37 to permit the passage of oil therethrough to the surface of the inner sleeve.

The upper three parallel grooves 38 are broken whereby the portion of each below the intake ports is isolated from that below the exhaust ports. A vertical groove 41 traverses the three parallel grooves below the intake port and is connected at its upper extremity with two inclined grooves 42 that extend to opposite corners of the exhaust port. A short vertical groove 43 extends downwardly from the mid-section of the exhaust port.

The inner sleeve, as represented in Fig. III, includes two continuous grooves 44 at the lower extremity of the sleeve and three grooves 45 above the continuous grooves that are broken in a manner similar to those on the outer sleeve, whereby the portion of each groove below the intake port is separated from that below the exhaust port. A vertical groove 46 extends from the base of the sleeve upwardly on the intake port side through the grooves 44 and 45.

In the modification of the outer sleeve, illustrated in Fig. IV, the two lower grooves 48 are the same as grooves 36, illustrated in Fig. II. The upper three grooves differ in that horizontal grooved portion below the exhaust port is omitted and the grooves below the intake port are joined at their opposite ends by vertical grooves 49 which are inclined and extend to the opposite corners of the exhaust port. A short vertical groove 50 extends downwardly from the mid-section of the third horizontal groove.

In either embodiment the grooves 43 and 50 are in communication with the source of vacuum through the tapped opening 13 during the portion of the cycle that the exhaust port in the sleeve is below the exhaust port in the cylinder. Under these conditions, the exhaust port aperture in the outer sleeve forms a chamber which communicates the suction through the inclined groove 42 to the grooved area about the intake port, including the parallel grooves and the transverse vertical groove. The hole 52 at the base of the vertical groove 41 interconnects the inner and outer sleeve surfaces.

While the sleeves are under the influence of the source of suction, as illustrated in Figure I, and described hereinabove, the oil which normally accumulates over the area of the sleeve below the intake port is drawn through the inclined grooves to the exhaust port region where the need of oil is greater and the supply less than below the intake ports. Some of the oil may be drawn through the exhaust port chamber and the tapped opening to the source of suction. Ordinarily, however, the oil which is drawn into the exhaust port aperture will be conducted into the exhaust manifold by the force of the exhaust gases.

It is to be noted that the oil which is drawn into the exhaust port aperture of the sleeve is being discharged into the exhaust manifold by the flow of combustion gases therethrough, the source of suction being cut off by reason of the movement of the sleeve upward beyond the point at which the channel is connected therewith. After the combustion gases have been exhausted, the sleeves again move into position whereby the exhaust port aperture of the outer sleeve forms a duct portion communicating sub-atmospheric pressure from the intake manifold to the intake port region of the sleeves. If desired, an air bleed may be provided which facilitates the movement of the oil in the grooves. This may be provided as illustrated in Fig. III, by extending the vertical groove downwardly to a position where the extremity thereof is at all times exposed to the atmosphere.

The operation of the structure, embodying the sleeve illustrated in Fig. IV, is not unlike that illustrated in Fig. II. While the area from which oil is withdrawn below the intake ports is somewhat greater the principle of operation is the same.

Although there has been described but a single embodiment of the present invention, together with one modification thereof, it will be apparent to those skilled in the art that the principles herein set forth are susceptible to other modifications which fall within the scope of my invention, and I desire, therefore, that it be limited only as indicated in the claims.

I claim:

1. In a sleeve valve engine a reciprocatory sleeve having intake and exhaust ports, a lubrication system for the sleeve valve including a source of suction, and means for communicating said suction to the portion of the sleeve adjacent the intake port by way of the exhaust port.

2. In a sleeve valve engine a reciprocatory sleeve having intake and exhaust ports, a lubrication system for the sleeve valve including a source of suction, and means for communicating said suction to the portion of the sleeve adjacent the intake port by way of the exhaust port side.

3. In a sleeve valve engine a reciprocatory sleeve having intake and exhaust ports, a lubrication system for the sleeve valve including a source of suction, and means adapted to withdraw surplus oil adjacent the intake port to the exhaust port and discharge the oil so withdrawn through the exhaust port.

4. In a sleeve valve engine a reciprocatory sleeve having intake and exhaust ports, a lubrication system for the sleeve valve including a source of suction, and means adapted to withdraw surplus oil adjacent the intake port to the exhaust port and discharge the oil so withdrawn through the port by means of exhaust gases.

5. In a sleeve valve engine a reciprocatory sleeve provided with intake and exhaust ports on opposite sides thereof and having a grooved surface portion extending from the intake port side to the exhaust port and means for communicating suction to the intake port side by way of the exhaust port side.

6. In a lubrication system for an engine having a sleeve valve provided with an exhaust port aperture, a source of suction, and means interconnecting said source of suction with the sleeve whereby suction will be created in the exhaust port aperture while said aperture is in a closed position.

7. A sleeve valve engine, embodying a cylinder block provided with intake and exhaust ports, a sleeve valve reciprocally disposed therein having intake and exhaust port apertures co-operatively disposed with respect to the ports in the cylinder block, grooves on the surface of said valve sleeve extending from the area about the intake port to the exhaust port, and means for communicating suction to the intake port area while the exhaust port is closed.

8. A sleeve valve engine, embodying a cylinder block provided with intake and exhaust ports, a sleeve valve reciprocally disposed therein having intake and exhaust port apertures co-operatively disposed with respect to the ports in the cylinder block, grooves on the surface of said valve sleeve extending from the area about the intake port to the exhaust port, a lubrication system for said sleeve comprising a source of suction, and means for communicating the suction to the exhaust port aperture while said port is in a closed position.

9. A Knight engine, embodying a cylinder block provided with intake and exhaust ports, a sleeve valve reciprocally disposed therein having intake and exhaust port apertures co-operatively disposed with respect to the ports in the cylinder block, grooves on the surface of said valve sleeve extending from the area about the intake port to the exhaust port, a lubrication system for said sleeves comprising a source of suction, and means for communicating the suction through the block below the exhaust port in communicative relation with the valve exhaust port aperture while said valve is closed with respect to the cylinder block ports.

10. In combination with a sleeve valve engine; a pair of reciprocatory sleeves having intake and exhaust ports; a source of lubricant; means associated with the sleeves whereby reciprocatory motion of said sleeves causes lubricant to be conveyed adjacent to the intake port area; and means in one sleeve for transferring lubricant from the intake port area to a portion adjacent the exhaust port area.

11. In combination with a sleeve valve engine, a pair of reciprocatory sleeves having intake and exhaust ports; a source of lubricant; means associated with said sleeves for conveying lubricant adjacent to the intake port area; means including a groove for transferring lubricant from the intake port area to the exhaust port area and means for returning a portion of said lubricant to said source.

12. A lubrication system for engines including a reciprocatory sleeve having intake and exhaust ports; a source of lubricant; means for lubricating a portion of said sleeve from said source; suction means to circulate said lubricant on said sleeve, said means being adapted to draw lubricant to the exhaust port area and return a portion of said lubricant to said source.

13. A lubrication system for engines including a plurality of reciprocating sleeves having intake and exhaust ports; grooves in said sleeves; a source of lubricant; means for lubricating a portion of said sleeves from said source through said grooves; suction means to transfer lubricant from said grooves to the exhaust port area whereby portions of the lubricant are discharged through the exhaust port and portions returned to the source of lubricant.

In testimony whereof, I affix my signature.

WARREN T. HUNT.